Jan. 26, 1943.  R. HANCOCK ET AL  2,309,189
ELECTRIC BOX HOLDER
Filed Oct. 30, 1940

INVENTORS.
REYNOLDS HANCOCK
AND ALEXANDER HARRIS.
BY Leo F. Parker
ATTORNEY.

Patented Jan. 26, 1943

2,309,189

UNITED STATES PATENT OFFICE 2,309,189

ELECTRIC BOX HOLDER

Reynolds Hancock, Dayton, and Alexander Harris, Bellevue, Ky.

Application October 30, 1940, Serial No. 363,450

1 Claim. (Cl. 248—27)

The invention relates to means particularly adapted for use in holding electrical wall boxes in a stationary position.

Considerable difficulty and expense has been experienced by builders, electrical contractors, and the like, in installing and retaining electrical wall boxes, and accessories, in fixed position, particularly when the thickness of the plaster, wall board and the like varies.

Therefore, the objects of the invention are to provide a simple, practical and economical device adapted for utilization by persons who fasten electrical wall boxes in walls; to provide means whereby said device may be quickly and securely adjusted in consideration of the thickness of plaster, wall board, or other studding covering, to retain said wall box in fixed relation to said wall.

The invention consists in the combination of the elements, arrangement of the parts and in the details of the construction, as hereinafter claimed.

Figures 1, 2:
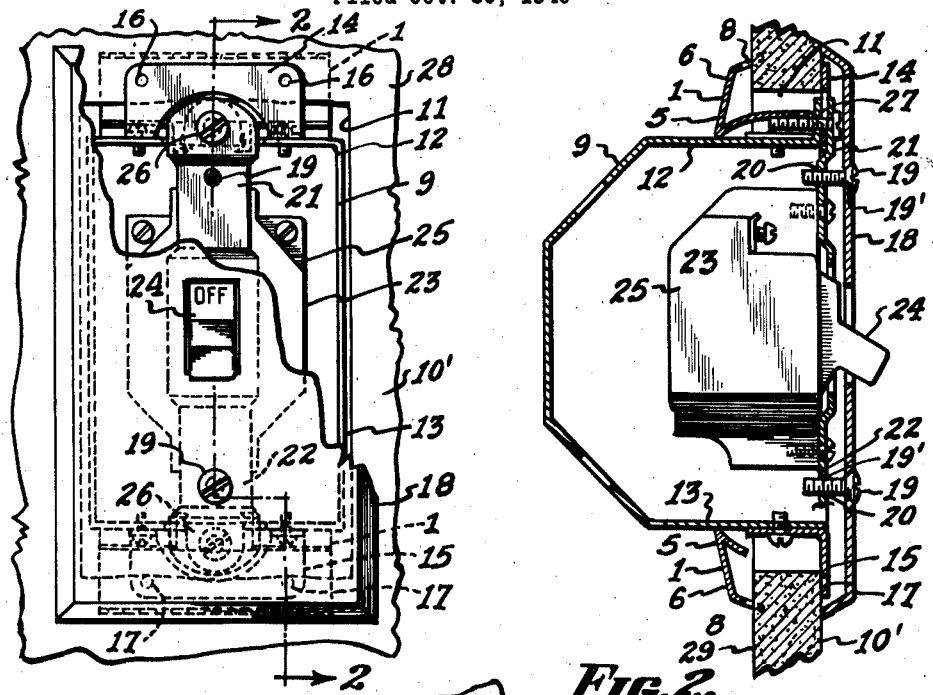
Fig. 1 is a front view of the wall box, switch and wall plate with parts broken away, and having the invention incorporated therewith.
Fig. 2 is a section taken on a line corresponding to 2—2 in Fig. 1.

In the preferred construction of the invention, I provide the strap or clamp 1 formed from spring metal and comprising a body 2 having in its outer end 3 a plurality of spaced apart holes or slots 4. The inner end 5, of the strap, is bent to form the hook 6 having formed on its edge 7 the teeth 8.

The purpose of the strap 1 is to hold the usual electrical wall box 9 in stationary position with respect to the wall 10.

The box 9 is received in the hole or recess 11 in the wall 10 and has integrally formed on the outer edges of the upper and lower sides 12 and 13 outwardly extending ears 14 and 15 having therein the holes 16 and 17 through which, under ordinary and usual use, screws are received for fastening the box to the plaster or wall board 10'.

The usual front or cover plate 18 is secured in contact with the outer surface of the wall 10 as by the screws 19 received through the holes 19' in the plate 18 and being threaded in holes 20 in the legs 21 and 22 of the usual switch 23. The switch 23 comprises the usual manually operated outwardly extending toggle 24 which operates usual mechanism in the container 25, to which the legs 21 and 22 are attached.

In the outer ends of the legs 21 and 22 are holes which receive the screws 26 being threaded in the holes 27 in the upper and lower ends of the wall box 9 for the purpose of retaining the switch in fixed relation to the wall box.

Figure 3:
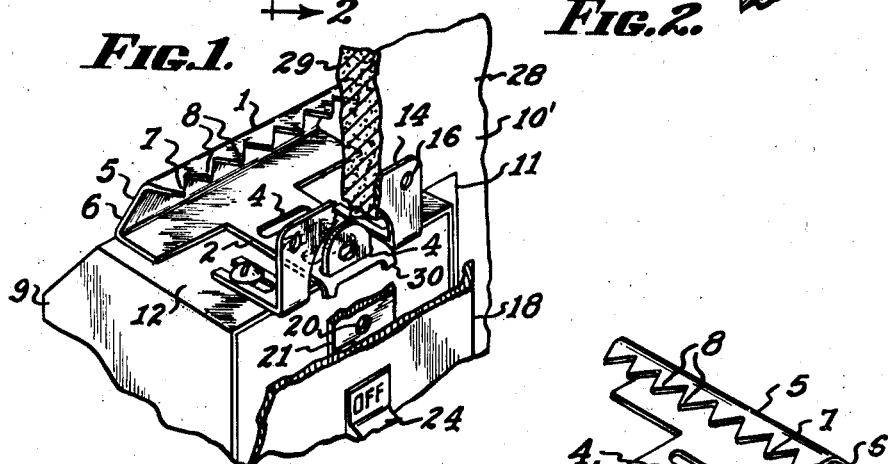
Fig. 3 is a perspective view of the wall box, and switch, with parts shown broken away, and having the invention incorporated therewith.
Figure 4:
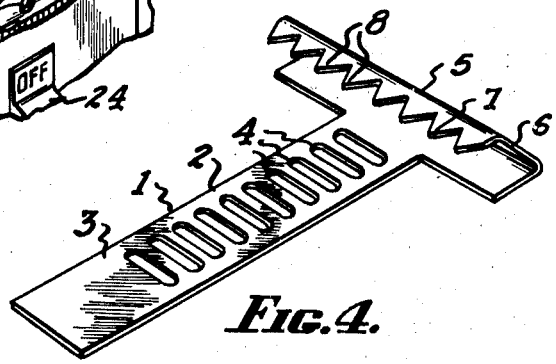
Fig. 4 is a perspective view of the clamp.

The box 9 is secured in the recess 11, as follows:

The box 9 is positioned in the recess 11 whose size is predetermined to permit the inner sides of the lugs 14 and 15 to contact the outer surface 28 of the wall 10, after the two hooks 6 of the two clamps 1 are inserted in the recess 11 and the teeth 8, of the hooks, are manually placed in contact with the inner surface 29 of the wall board or plaster 10'. Then the ends 3, of the clamps, are manually moved inwardly of the box 9, and the slots 4, which are conveniently positioned to receive the outer ends of the legs 21 and 22, receive said outer ends of the legs 21 and 22, it being understood that the metal of the clamps 1 are in tension to exert force inwardly of the switch 12 whereby the box 9 is forced inwardly and the ears 14 and 15 are retained in contact with the wall 10. The ends 3, of the clamps 1, beyond the slots 4, which receive the outer ends of the legs 21 and 22, may be cut or broken off at 30, as shown in Fig. 3. Then the screws 26 are passed through the aligned holes in the legs 21 and 22, the slots 4 and the holes 27 whereby the box 9 and switch 23 are retained by the clamps 1 in stationary position.

An advantage of the invention is that a usual electrical wall box 9 may be fastened in the usual recess in a wall, designed to receive the box, without necessity of inserting screws or other fastening devices in the wall and, furthermore, the clamps or straps 1 are adjustable in consideration of the thickness of the wall, wall board or plaster in which the box is secured. Also, the tension in the straps retains the box in fixed position with respect to the wall.

Therefore, it is quite apparent that we have invented a simple, practical and advantageous device whose purpose is to quickly and conveniently enable users to fasten electrical boxes in usual wall recesses.

While we believe that the form of the invention illustrated in the drawing and referred to in the above description, as the preferred embodiment, is efficient and practicable, yet realizing that the conditions concurrent with the adoption of the device will necessarily vary, we desire to emphasize the fact that changes in the details may be resorted to, when required, without sacrificing any of the advantages of the invention, as defined in the claim.

Various changes might be made in the general form and arrangement of parts described without departing from the invention, and hence we do not limit ourselves to the precise details of the materials or the size and shape thereof as set forth, but consider ourselves at liberty to make when such changes and alterations that fall within the spirit and scope of the appended claim.

What we claim as new and desire to secure by Letters Patent is:

Means to secure a box in a recess in a support, said means comprising a strap formed from spring material and having a hook on one end to engage the inner side of said support, the other end of said strap being in fixed relation with said box, and when tension is in said strap a portion of said box is forced in contact with the support and retained in stationary position with relation to said support.

REYNOLDS HANCOCK.
ALEXANDER HARRIS.